FLEXIBLE STORABLE SOLAR CELL ARRAY

Filed April 28, 1966 2 Sheets-Sheet 1

INVENTORS
ARTHUR E. MIDDLETON
EDWIN R. HILL
BY Harry A. Herbert Jr
ATTORNEY
Eugene J. Pawlikowski
AGENT

FLEXIBLE STORABLE SOLAR CELL ARRAY

Filed April 28, 1966 2 Sheets-Sheet 2

INVENTORS
ARTHUR E. MIDDLETON
EDWIN R. HILL
BY Harry A. Herbert Jr
ATTORNEY
Eugene J. Pawlikowski
AGENT 3,411,050

FLEXIBLE STORABLE SOLAR CELL ARRAY

Arthur E. Middleton and Edwin R. Hill, Columbus, Ohio, assignors to the United States of America as represented by the Secretary of the Air Force Filed Apr. 28, 1966, Ser. No. 546,487
1 Claim. (Cl. 317—234)

ABSTRACT OF THE DISCLOSURE

Apparatus having a flexible matrix for carrying solar cells in electrical circuit array quickly movable between storage and extended positions. The cells are encapsulated between transparent layers of material. Flexible metal strips connect leads of cells.

This invention relates to photoconductive cells and, particularly, it relates to cadmium sulfide photoconductive cells and to a method of making the same.

Photoconductive cells for the generation of electrical energy under activation by solar energy have been known for some time. Some photoconductive materials exhibit exceptional conversion efficiency of light or solar energy to electrical energy, and one of these, cadmium sulfide (CdS), shows marked photoconductive effects. Such cells can be used in large numbers in a matrix arrangement, and one common practice heretofore has been to mount them on carriers made of relatively rigid material. When the weight and size of the support structure and the expense of preparing such matrix arrangements are considered, the conversion efficiency of present-day photoconductive cell arrays leaves much to be desired.

Accordingly, one object of this invention is to provide an improved photocell of the type using CdS as the photoconductive material.

Another object of this invention is to provide CdS photocell arrangements of various size and shape, and especially arrays of such cells which are flexible to the extent that they can quickly become operational once removed from a storage compartment.

Still another object of the invention is to provide improved CdS photocells of the front wall and back wall type.

A further object is to provide a CdS photocell array encased in a protective coating.

These and other objects and advantages of the present invention will be better understood from the following detailed description when read in conjunction with the appended drawings wherein.

Figure 1:
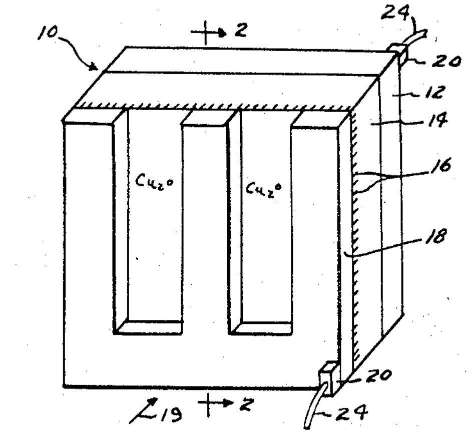
FIG. 1 is an elevational view in perspective of a CdS photoconductive cell of the invention.

Referring now to the drawings, FIG. 1 shows a front wall photoconductive cell embodying the invention generally designated 10 and comprising an electrically-conductive backing or substrate 12, a crystalline CdS layer 14 of semiconductor material laid upon body 12, a large area barrier layer 16 diffused into the opposite surface of the CdS layer as, for instance, by depositing copper on the crystalline surface and then thermally decomposing the copper film until a cuprous oxide ($Cu_2O$) layer over the surface of the crystal is formed, and an electrode layer 18 of an electrically conductive metal in contact with the barrier layer 16 and having an electrical work function greater than that of the barrier layer. The direction of the light or radiation is indicated by arrow 19. Accordingly, in front wall operation, incident light falls on the barrier layer before penetrating the CdS film.

The backing or substrate 12 can be of thin metal foil from the group consisting of molybdenum, tantalum and tungsten, or be an alloy of these metals which have an expansion coefficient to match that of CdS and which are capable of withstanding high processing temperatures. Furthermore, the electrical work function of backing 12 should be equal to or less than that of CdS. The electrode layer 18 may be silver deposited as a conductive paint. Also, it will be appreciated that electrode layer 18 can vary in appearance according to the shape of the mask employed during its application. Ohmic contacts are shown at 20—20 and leads of metal wire or foil are shown at 24—24.

It will be appreciated that the dimensions of the various layers of the device shown in FIGS. 1 and 2, as well as in the other figures of the drawings which will hereinafter be described, are in most cases exaggerated to afford convenience in the description.

The cadmium sulfide film 14 is formed onto substrate 12 by evaporation, for example, and the substrate is preferably heated at a temperature of from about 75 to 350° C., with deposition taking place at a rate of from about 4 to 500 microns per hour with from about 100 to 200 microns per hour being preferred. The prepared film 14 of calcium sulfide should be thick enough to subsequently take diffusion of the $Cu_2O$ barrier layer without the oxide deposits penetrating through the CdS film. Preferably, the cadmium sulfide layer is from 40 to 100 microns thick, which thickness will reduce to a minimum difficulties due to imperfections, cracks, and pits etc. introduced generally during the CdS evaporation process.

Certain advantages attend to forming the CdS film from undoped CdS single crystals chips or CdS powder of high purity. Doping agents, however, may be added to the CdS material when a reduction of its internal resistance is desired. For p-type doping, at least one element from Group III of the periodic table is required, for example, indium, boron or aluminum. For n-type doping, growing occurs in the presence of an impurity such as arsenic, antimony or phosphorous, which are elements from Group V of the periodic table.

A number of methods can be used for introducing dopants into CdS crystals during growth. For example, cadmium sulfide crystals may be doped by dipping the crystals in a solution containing the desired impurity, evaporating the solvent, and then diffusing the impurity into the crystals by thermal deposition. In a modification of this technique, the impurity is deposited on the surface of the crystal by vacuum evaporation and then, by firing the mixture, completing diffusion into the crystal structure. Properly doped CdS photoconductive crystals grown from either of the above-explained methods then can be disposed onto the backing 12 by standard bell-jar methods.

After the CdS material has been deposited onto the backing 12, the CdS layer is treated to provide the surface away from the backing with the barrier layer 16. Preferably, prior to develpoing the barrier layer, the exposed surface of the CdS layer 14 is abraded. The abrading may be accomplished by several methods of which lapping with fine abrasive grit or by means of sand blasting are given by way of example. Lapping with approximately 1000 grit $Al_2O_3$ abrasive has been found to give satisfactory results. After lapping, the CdS surface is preferably cleaned say, in HCl solution, and then washed in distilled or deionized water and then allowed to dry.

A method found acceptable for forming the barrier layer 16 is described and claimed in our S.N. 198,279, which was filed May 28, 1962, now abandoned. As set forth in said application, a liquid solution of a suitable copper compound such as, for example, copper acetate in alcohol is prepared. The cadmium sulfide crystal is then heated to a temperature of between about 250 and 300° C. and sprayed in air with a fine mist of the copper acetate solution. To avoid cooling the crystal below the desired temperature, the spray should not be applied too heavily nor too rapidly. The layer 16 which forms on the surface of the CdS is brownish-yellow in color and is the result of the cuprous acetate decomposing to copper which, during oxidation, becomes cuprous oxide.

To apply the barrier layer completely over the CdS layer when using finely divided cuprous suspensions or slurries, it is sometimes advantageous to repeat the step of applying the suspension after having allowed the solvent to evaporate. Loose particles of cuprous oxide formed by this method can easily be removed with no harm to the CdS surface. Several light applications of the suspension, one after another, followed by a single heat treatment, tend to give better results than a single application.

Another method for forming the barrier layer is to electroplate a layer of copper on the CdS layer at high current density from a plating solution and then oxidizing to form a cuprous oxide film. An example of a preferred plating solution is a very strong bath of nitric acid having the following approximate composition: 80 ml. nitric acid, 32 ml. water, 2 grams copper nitrate, and 5 ml. of polyethylene glycol 600. A platinum electrode is preferred although anodes of other metals or even copper anodes may be employed. Electroplating is carried out at a current density of approximately 100 ma./$cm.^2$ of crystal surface area. However, slightly greater or lesser current densities may be employed with little variation in the results. Electroplating is continued until a very dense and black-appearing deposit is formed. The conversion of the cuprous film to the $Cu_2O$ barrier layer occurs when, during firing, the dark-appearing deposit begins to appear brownish or yellowish in color.

Figure 2:
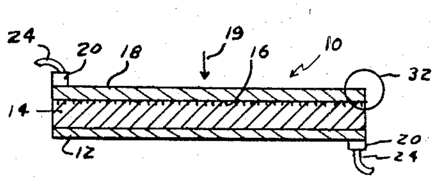
FIG. 2 is a sectional veiw taken along lines 2—2 of FIG. 1.
Figure 3:
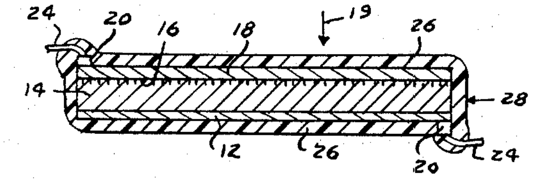
FIG. 3 is a sectional view similar to that of FIG. 2, except that the device has been encapsulated in a protective case.
Figure 4:
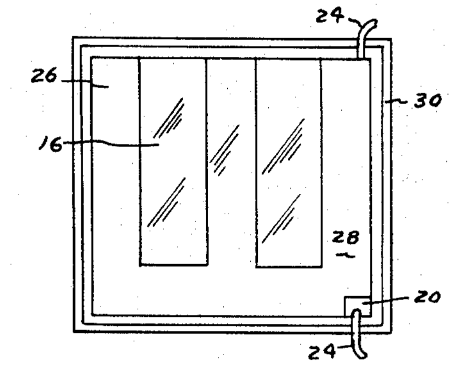
FIG. 4 is a top plan view of the device of FIG. 3.

Referring now to FIG. 3, the photoconductive cell 10 of FIGS. 1 and 2 is encapsulated between upper and lower panels 26—26 of a protective case 28 formed about cell 10 completely except for the extensions of leads 24—24 whose ends must remain uncoated to afford external connections to the current-conducting leads. Case 28 is of a light-permeable material in order to gain the photoconductive effect. The panels 26—26 are heat sealed along their periphery, such as at the bead or seal shown at 30 in FIG. 4, and the case 28 formed thereby is then evacuated to provide an essentially air-free pocket about cell 10. Alternatively, cell 10 may be arranged with the metal leads 24—24 held fast against their respective electrical layers such as to make electrical contact. Evacuation of the case 28 then collapses the material and creates a low resistance pressure fit between leads 24—24 and the electrode layers. Encapsulating cell 10 by this latter method provides a virtually air-tight cell and ohmic contacts and obviates heat connections of the conductors such as, for example, by conventional soldering methods.

Preferably, the panels 26—26 of case 28 are of a material impervious to water vapor or moisture, and the panels preferably are pliant and have thermoplastic qualities which permit them to undergo the application of heat without deterioration. If lacking thermoplasticity, the panels 26 should allow adhesion by means of solvents or adhesives, or by the use of plastic sealing agents adequate for furnishing a good peripheral bond. An adhesive which has proven useful for this purpose is cellulose acetate butyrate. Several suitable encapsulating materials are polychlorotrifluoro ethylene and other polyfluoro and chlorofluoro hydrocarbons, polyethylene or polypropylene, chlorinated polyethers, polystyrene, polyvinyl chloride, polyvinylidene fluoride, and so forth. Thermosets like the phenolformaldehyde and phenolfurfural molding compounds, the ureaformaldehyde compounds, allyl cast resins, the epoxy cast resins and the polyester resins can also be used as encapsulating materials provided that no water is needed or is given off during the reaction, and that the catalysts used for curing or crosslinking are non-migrating and inert with respect to the cell. Moreover, both the thermoplastics and thermosets should be inert with respect to the cell and should contain, when necessary, suitable antidegradants such as antioxidants, antiozonants, ultraviolet light adsorbers, free radical absorbers, and so forth. When plasticizers are used, they should be preferably of the non-migrating type and inert with respect to the cell.

In order to maintain the required strength, care should be taken to avoid a seal at the periphery 30 which is substantially thinner than the thickness of each panel itself. While the present invention mainly seeks an encapsulation which leaves a sheet pliable enough to be rolled up, it will be apparent that where pliability is unnecessary or where less resiliency in the case 28 is permitted, less pliable encapsulating materials can be employed.

Figure 5:
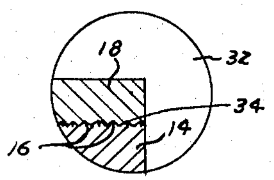
FIG. 5 is an enlargement, in section, of the area in FIG. 2 which has been encircled.

In FIG. 5, which is an enlargement of the area 32 encircled in FIG. 2, the abrasion to the surface of the CdS layer mentioned previously is shown by the irregular line 34. The abrasion effectively increases the surface area presented to the copper carrier during the formation of the $Cu_2O$ barrier layer. That is, the number of photovoltaic acting points and the number of sides containing photoconductive pair impurities should be maximized in order to increase the photoconductive efficiency of the CdS. Roughening the surface of the CdS has shown a proportionate increase in the number of points per unit area offering a diffusion surface to the cuprous ingredients.

Figure 6:
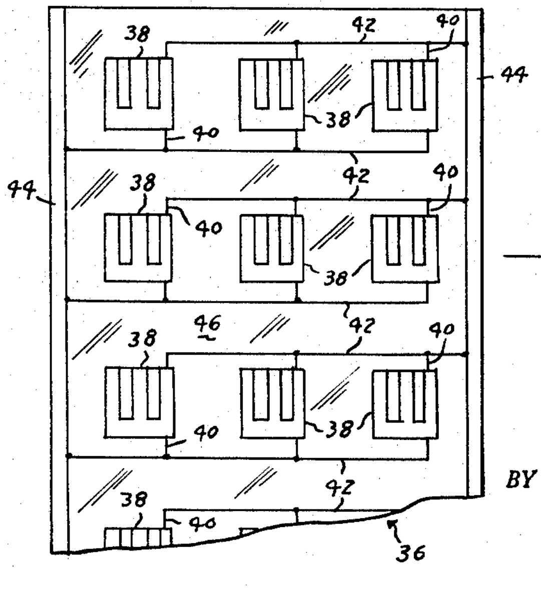
FIG. 6 is a top plan view of a matrix of photocells of the type shown in FIG. 1.

Referring now to FIG. 6, there is shown an array 36 of photoconductive cells 38 each of which may be the same as the cell 10 described previously in connection with FIGS. 1 through 5. As shown in FIG. 6, cells 38 are arranged in orderly rows and columns for maximum exposure to incident light. Although constituting individual cells, it will be understood that cells 38 operate in harmony for the generation of photoelectric current. The light, for example, will be assumed to fall onto the plane of the paper on which FIG. 6 is shown. The leads 40—40 of each cell are connected by electrically-conductive leads 42—42 to main current collectors 44—

44 of flexible metal, respectively. Encapsulation of the cells 38 is provided by a transparent cladding 46 inclusive of upper and lower panels which may be of a material taken from the group previously set forth during the discussion of FIGS. 3 and 4. Cladding 46 forms a protective jacket which extends beyond the edges of the cells 38 in order to allow sealing of the contacting surfaces. As seen, the edges of the panels are joined along lines which define the outlines of a substantially planar sheet having essentially rectangular dimensions. A parallel connection of cells is shown in FIG. 6; a series bank can, of course, readily be imagined. Moreover, it is evident that certain of the cells 38 can be connected in parallel with the others left to form a series arrangement. It will be obvious in FIG. 5 that the panels of cladding 46 will be in spaced apart relationship at each location of a cell 38.

Figure 7:
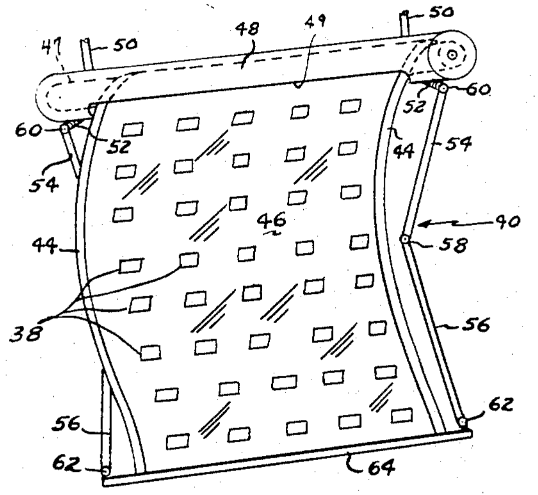
FIG. 7 is an elevational view in perspective of a collapsible device suitable for supporting a matrix of photocells of the type shown in FIG. 6, in order to permit either exposure to or concealment from incident light.

Referring now to FIG. 7, reference character 40 generally designates a device capable of exposing a plastic-encapsulated array of cells 38 of the type shown in FIG. 6 to effect conversion of light radiation to electrical energy. Suitable electrical connections between cells 38 and main current collectors 44—44 have been omitted for the sake of clarity. As previously described in connection with FIG. 6, a pliable and transparent cladding 46 forms a protective case about each cell and maintains the cells in fixed relationship with each other. One end of the cladding 46 is wound onto a mandrel 47 rotatably mounted in a cylindrical carrier 48 which, for example, may be suspended from hanger straps 50—50. An axially-extending opening 49 is provided in the wall of carrier 48 for receiving the cladding. A quick withdrawal of the combined cladding and cell framework is made possible by means of an ejection mechanism which includes a pair of coil springs 52—52 which are disposed at opposite ends of case 48. One end of each of springs 52—52 is connected to carrier 48. The other end of each spring is connected in abutting relation with the top one of two pivotally-mounted connecting rods 54 and 56. These rods have essentially ring-shaped ends and are free to revolve with respect to each other, their mounting being completed by a center pin 58 and end pins 60 and 62. The lower end of rod 56 is connected to a stiff bar 64 which is clamped or otherwise secured to the lower end of cladding 46. When the cell structure is to be protected from incident light, the lower ends of bars 56 are swung upwardly in the direction of carrier 48 a degree according to which the cladding 46 is rolled onto the mandrel. During the pivotal movement of the bars 56 in the direction indicated, springs 52—52 become compressed under the action of the bars 54—54. Once inside container 48, the rolled-up material is held there, for example, by a suitable latch or lock (not shown) which is so arranged that, for conversion of solar or light energy to electrical energy, the lock is released by means of an electrical signal, mechanical impulse or the like. With the lock turned out of the way, springs 52—52 are free to expand and, accordingly, they pivotally rotate rods 54 and 56 in the opposite direction which forces withdrawal of the material away from carrier 48 until the fully extended position illustrated in FIG. 7 is reached. The exposed cells and carrier thus admit of a considerable and essentially planar surface which can, if preferred, be turned to meet the full force of the incident light.

Figure 8:
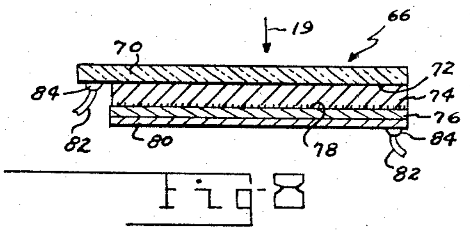
FIG. 8 is a sectional view of a CdS photocell similar to that shown in FIG. 2, except that here construction is of the back wall type and the dimension of the $Cu_2O$ layer has been greatly exaggerated.

FIGS. 8–11 relate to an embodiment of the invention operating in a mode commonly referred to as the "back wall" type which is where incident light must first pass through the CdS layer to reach the barrier layer. Referring specifically to FIG. 8, a back wall cell generally designated 66 comprises a plurality of sheetlike elements arranged in the following order: a thin, flexible and light-transparent sheet 70; a transparent conductive layer 72 formed, for example, of tin oxide; a CdS layer 74; a layer 76 of $Cu_2O$ of exaggerated dimensional scale which provides a barrier layer shown at 78; and a conductive metal 80 which may be silver sprayed over the $Cu_2O$ layer to act as a conductive paint. Leads 82—82 and ohmic contacts 84—84 which contact the oxide layer 72 and the conductive paint 80, respectively, render the assembly complete. The $Cu_2O$ layer 76 has not been shown in FIGS. 9 and 10 inasmuch as the barrier layer 78 will usually be very thin. Accordingly, it will be understood that the $Cu_2O$ layer and the barrier layer 78 are actually one and the same due to their homogeneity. The actual process of baking and forming the back wall cell 66 will be evident from the techniques described hereinabove where the discussion of FIGS. 1–3 was taken up.

Figure 10:
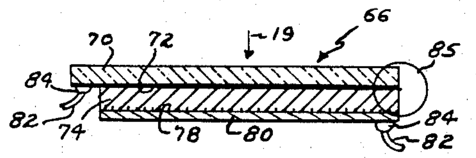
FIG. 10 is a sectional view taken along the lines 10—10 of FIG. 9.
Figure 11:
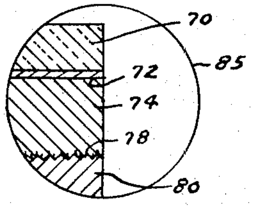
FIG. 11 is an enlargement of the encircled area shown in FIG. 10.

The area 85 encircled in FIG. 10 is reproduced in FIG. 11 to show the various layers in exaggerated detail.

Figure 9:
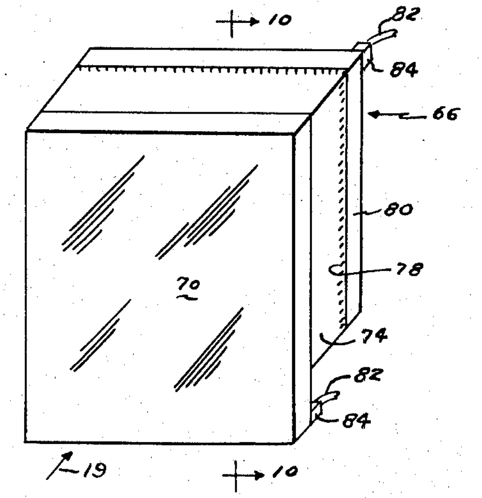
FIG. 9 is a perspective elevaional view of the photocell of FIG. 8 showing the $Cu_2O$ layer reduced to merely the diffusion layer.

It will be understood by those skilled in the art that back wall cells of the type shown in FIGS. 8–10 may find successful application in the ejection mechanism embodiment of FIG. 7 if substituted for the front wall cells 38 shown therein.

Figure 12:
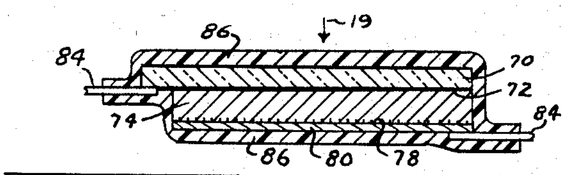
FIG. 12 is substantially FIG. 10 shown again, except that here encapsulation of the back wall construction is illustrated.
Figure 13:
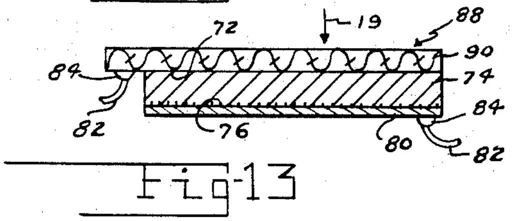
FIG. 13 is a sectional view of a modification of the device of FIG. 9, in which a layer of woven glass fibers forms the light-transmitting medium.

An improved photocell of the type shown in FIGS. 9 and 10 appears in FIG. 12 encapsulated in upper and lower panels 86—86 of transparent material. In the mode shown, leads 84—84 have been press fitted against the oxide 72 and the conductive paint 80 and are held in the positions shown by the plastic encapsulation to provide sound ohmic contacts. In FIG. 13, there is shown a photocell 88 identical in all respects to that shown in FIG. 10, except that here the sheet 70 has been replaced by a sheet 90 of woven glass fibers coated on the side adjacent the CdS layer 74 with a conductive layer 72 of tin oxide or other electrically-conductive material of suitable transparency.

Figure 14:
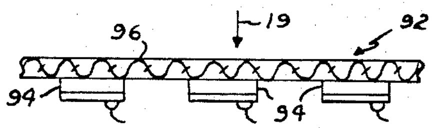
FIG. 14 is a modification of the single cell device of FIG. 12 and illustrates the conductive light-transmitting layer extended in the major plane to accommodate a plurality of CdS-type photocells.

The photocell assembly 92 in FIG. 14 is a modification of that shown in FIG. 13 in order to take advantage of the long, flat planar surface typical of a continuous sheet of electrically-conductive woven glass fiber. As seen in FIG. 14, a plurality of photocells 94 which may be the back wall type hereinabove described downwardly depends from a sheet 96 of woven glass fibers; a support and light-transmitting layer common to all of the cells is therefore provided. The cells, although not shown electrically connected in FIG. 14 for ease in outlining the figure, will operate in common for converting light to electrical energy. If preferred, the assembly can be encapsulated after the manner of FIGS. 3 and 12 or, alternatively, certain of the cells may be left uncovered and the others be subjected to encapsulation. In arrangements proposed for the connection of a matrix of back wall cells, the cells can be, like front wall cells, electrically connected in series and/or in parallel.

In one experimentally successful operation of a front wall photocell of this invention, CdS undoped single crystal chips were evaporated at about 300° C. on a 1" x 3" molybdenum base (with thickness about 2.0 mil) to a depth of about 60 microns at a rate of about 150 microns/hour, following which the exposed surface was subjected to a copper electroplating treatment as disclosed above to obtain a black mossy copper deposit. After this step, a heat treatment in air at about 275° C. for 10 seconds oxidized the copper deposits. Excessive $Cu_2O$ oxide was then removed with an ammonium chloride bath after which a composition silver coating was applied. Following encapsulation by means of polychlorotrifluoro ethylene and hydrostatic pressing under heat, the cell showed a solar energy conversion efficiency of greater than 0.57° and, in a number of cases, greater than 1.07°.

A back-wall type photocell of similar dimension was prepared by using a thin transparent base such as Pyrex and covering the $Cu_2O$-treated CdS with a silvery paint. The resulting embodiment gave a solar energy conversion efficiency of approximately 2.4%. Another front wall cell with a molybdenum substrate and whose solar energy conversion efficiency was 0.8% yielded approximately 4 watts per pound of weight before encapsulation and about 2.4 watts per pound of weight after encapsulation under simulated extraterrestrial radiation.

It will be apparent to those skilled in the art that changes and modifications of the several embodiments of the invention illustrated and described herein may be made without departing from the spirit of the invention or the scope of the appended claim.

We claim:

1. Apparatus for subjecting electrical energy-generating objects to penetrating light or solar radiation comprising:
  a carrier of generally cylindrical shape having an axially-extending opening in the wall thereof;
  a mandrel rotatably mounted in said carrier;
  a plurality of photoconductive cells each having output leads in circuit with each other and which join to form a pair of current-conducting electrodes to permit withdrawal of electrical energy;
  transparent and resilient means for encapsulating said cells in such manner as to form a clear plastic encapsulated sheet having a substantially planar form and essentially rectangular dimensions;
  means for attaching the uppermost end of said sheet to said mandrel through said opening;
  rigid bar means attached to the lowermost end of said sheet whereby through movement of said bar means away from said carried the full length of said sheet said cells may be exposed to said light energy;
  pivotally mounted extensible means disposed in the space between said carrier and said bar means on both sides of said sheet and being fixedly connected to said bar means;
  said extensible means being movable between a first position in which said sheet is fed onto said mandrel for concealment from said light radiation and an extended second position in which said cells are exposed for activation by said light radiation;
  and yieldable means bearing on said extensible means and being compressed when said extensible means is in said first position thereof and biasing said extensible means to said second position thereof for effecting conversion of said light radiation to electrical energy;
  said current-conducting electrodes being two flexible strips of metal disposed adjacent the outer margins of said sheet and extending in substantially parallel relation between the upper and lower ends of said sheet.

References Cited

UNITED STATES PATENTS

| | | | |
|---|---|---|---|
| 1,892,558 | 12/1932 | Walker | 160—70 |
| 3,040,416 | 6/1962 | Matlow | 29—155.5 |
| 2,820,841 | 1/1958 | Carlson | 136—89 |
| 2,321,801 | 6/1943 | Dazzo | 160—69 |

JOHN W. HUCKERT, *Primary Examiner.*

M. EDLOW, *Assistant Examiner.*